United States Patent
Chou et al.

(10) Patent No.: US 11,902,803 B2
(45) Date of Patent: Feb. 13, 2024

(54) PHYSICAL-LAYER CELL IDENTIFIER (PCI) CONFIGURATION AND MOBILITY ROBUSTNESS OPTIMIZATION FOR FIFTH GENERATION SELF-ORGANIZING NETWORKS (5G SON)

(71) Applicant: Intel Corporation, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 385 days.

(21) Appl. No.: 16/911,017

(22) Filed: Jun. 24, 2020

(65) Prior Publication Data
US 2020/0322817 A1 Oct. 8, 2020

Related U.S. Application Data

(60) Provisional application No. 62/882,388, filed on Aug. 2, 2019.

(51) Int. Cl.
| | | |
|---|---|---|
| H04W 24/02 | (2009.01) | |
| H04W 24/04 | (2009.01) | |
| H04W 8/26 | (2009.01) | |
| H04W 24/10 | (2009.01) | |
| H04L 61/5046 | (2022.01) | |
| H04W 84/18 | (2009.01) | |

(52) U.S. Cl.
CPC ......... H04W 24/04 (2013.01); H04L 61/5046 (2022.05); H04W 8/26 (2013.01); H04W 24/10 (2013.01); H04W 84/18 (2013.01)

(58) Field of Classification Search
None
See application file for complete search history.

(56) References Cited

U.S. PATENT DOCUMENTS

2012/0275315 A1* 11/2012 Schlangen ............ H04W 24/02
370/242
2022/0167229 A1* 5/2022 Chou .................... H04W 24/02

OTHER PUBLICATIONS

3GPP, "Technical Specification Group Radio Access Network; Study on RAN-centric data collection and utilization for LTE and NR (Release 16)," 3GPP TR 37.816 V16.0.0 (Jul. 2019), 5G, 35 pages.
3GPP, "Technical Specification Group Services and System Aspects; Management and orchestration; Generic management services; (Release 16)," 3GPP TS 28.532 V16.0.0 (Jun. 2019), 5G, 180 pages.
3GPP, "Technical Specification Group Radio Access Network; NR; Radio Resource Control (RRC) protocol specification (Release 15)," 3GPP TS 38.331 V15.6.0 (Jun. 2019), 5G, 519 pages.

(Continued)

*Primary Examiner* — Willie J Daniel, Jr.
(74) *Attorney, Agent, or Firm* — Schwabe, Williamson & Wyatt, P.C.

(57) ABSTRACT

Methods, systems, and storage media are described for physical-layer cell identifier (PCI) configuration and Mobility Robustness Optimization (MRO). In particular, some embodiments may be directed to fifth-generation self-organizing network (5G SON) solutions such as the management of distributed physical-layer cell identifier (PCI) configuration, centralized PCI configuration, and MRO. Other embodiments may be described and/or claimed.

14 Claims, 10 Drawing Sheets

(56) References Cited

OTHER PUBLICATIONS

3GPP, "Technical Specification Group Services and System Aspects; Management and orchestration; Fault Supervision (FS); (Release 15)," 3GPP TS 28.545 V15.1.0 (Dec. 2018), 5G, 27 pages.
3GPP, "Technical Specification Group Radio Access Network; NR; Physical channels and modulation (Release 15)," 3GPP TS 38.211 V15.6.0 (Jun. 2019), 5G, 97 pages.
3GPP, "Technical Specification Group Services and System Aspects; Management and orchestration; 5G performance measurements (Release 16)," 3GPP TS 28.552 V16.2.0 (Jun. 2019), 5G, 98 pages.

* cited by examiner

100

Detecting a PCI conflict among a plurality of new radio (NR) cells
105

Reassigning PCI values from a PCI list to the plurality of NR cells to mitigate the conflict
110

Generating a resolution notification indicating the PCI conflict has been resolved
115

Collecting PCI-related measurements
205

Identifying, based on the PCI-related measurements, PCI conflict or PCI confusion for a new radio (NR) cell
210

Configuring a PCI value or list of PCI values for the NR cell to mitigate the PCI conflict or PCI confusion
215

Detecting a handover (HO) issue with intra-radio access technology (RAT) or inter-RAT mobility
305

Adjusting an HO parameter to mitigate the HO issue
310

Generating a notification to indicate the HO parameter has been changed
315

PHYSICAL-LAYER CELL IDENTIFIER (PCI) CONFIGURATION AND MOBILITY ROBUSTNESS OPTIMIZATION FOR FIFTH GENERATION SELF-ORGANIZING NETWORKS (5G SON)

RELATED APPLICATIONS

This application claims priority to U.S. Provisional Patent Application No. 62/882,388 filed Aug. 2, 2019 and entitled "PHYSICAL-LAYER CELL IDENTIFIER (PCI) CONFIGURATION AND MOBILITY ROBUSTNESS OPTIMIZATION FOR FIFTH GENERATION SELF-ORGANIZING NETWORKS (5G SON)," the entire disclosure of which is incorporated by reference in its entirety.

FIELD

Embodiments of the present disclosure relate generally to the technical field of wireless communications.

BACKGROUND

Among other things, embodiments of the present disclosure relate to physical-layer cell identifier (PCI) configuration and Mobility Robustness Optimization (MRO). In particular, the present disclosure discusses fifth-generation self-organizing network (5G SON) solutions such as the management of distributed physical-layer cell identifier (PCI) configuration, centralized PCI configuration, and MRO.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

Figure 4A:
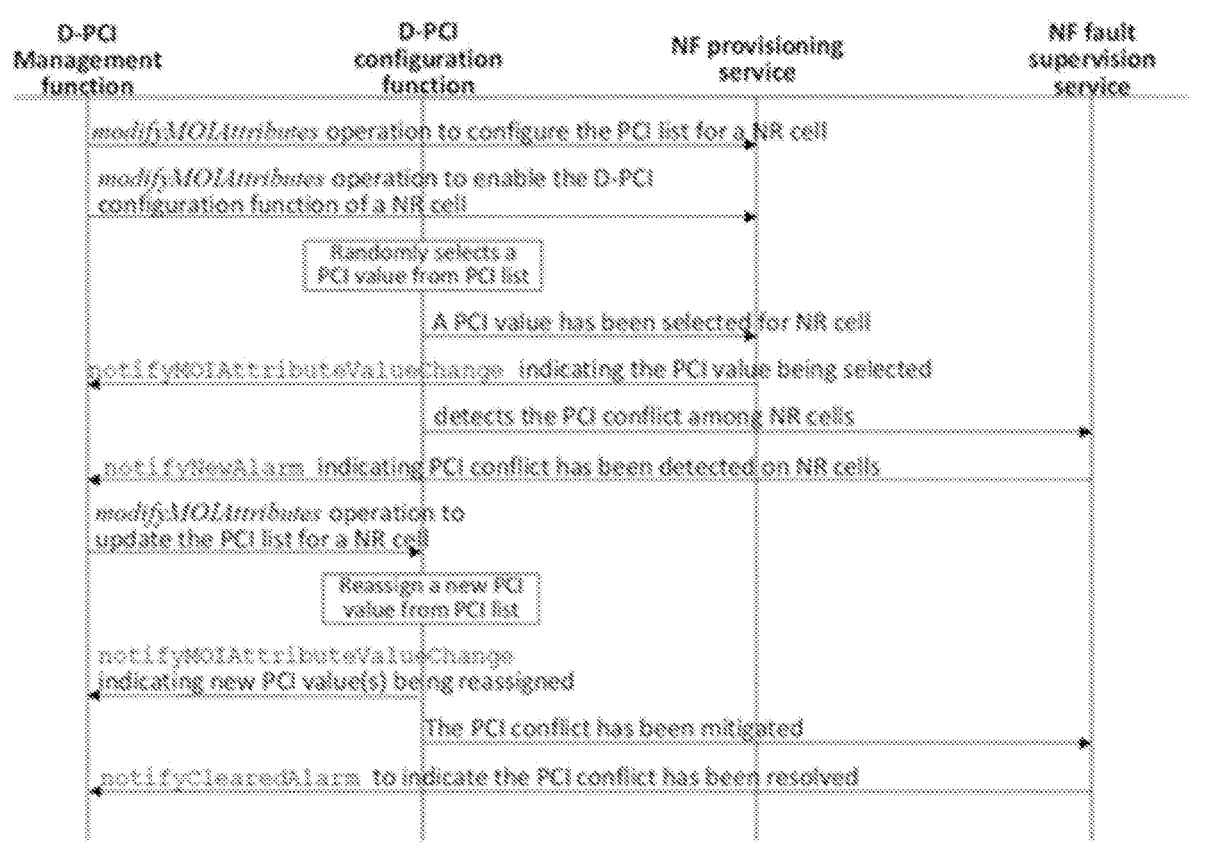

FIG. 4A illustrates an example of the management of distributed physical-layer cell identifier configuration in accordance with some embodiments.

DETAILED DESCRIPTION

Figure 4B:
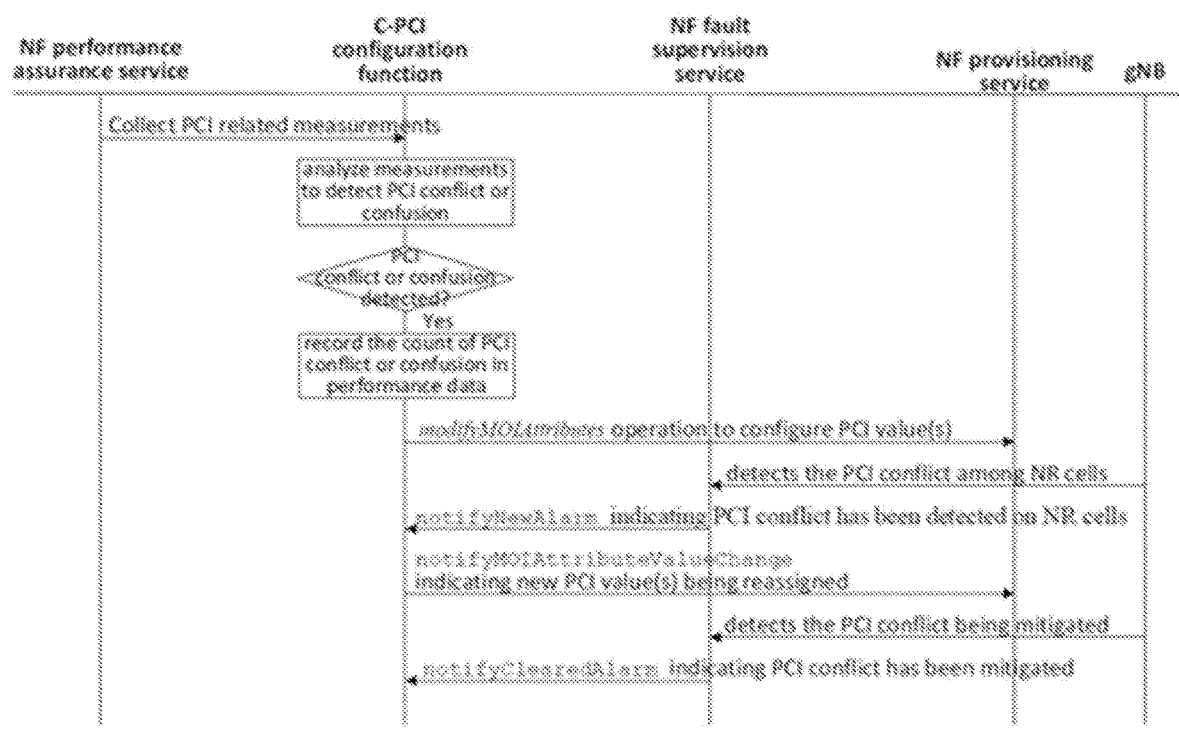
FIG. 4B illustrates an example of centralized physical-layer cell identifier configuration in accordance with some embodiments.

Among other things, embodiments of the present disclosure relate to physical-layer cell identifier (PCI) configuration and Mobility Robustness Optimization (MRO). In particular, some embodiments are directed to fifth-generation self-organizing network (5G SON) solutions such as the management of distributed physical-layer cell identifier (PCI) configuration, centralized PCI configuration, and MRO. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Each next-generation NodeB (gNB) is assigned a PCI (Physical-layer Cell ID) that is broadcast in PSS (Primary Synchronization signal) and SSS (Secondary Synchronization signal). When a user equipment (UE) receives PSS and SSS to acquire time and frequency synchronization, it also obtains the PCI that is used to uniquely identify a new radio (NR) cell. There are 1008 unique PCIs. Therefore, PCIs need to be reused, as massive number of NR cells and small cells operating in millimeter wave bands are often deployed. Typically, operators use network planning tool to assign PCIs to cells when the network is deployed to insure all neighboring cells have different PCIs.

However, due to the addition of new cells or changes of neighbor relations from ANR functions, problems can arise, such as PCI collision, where two neighboring cells have the same PCIs, and PCI confusion, where a cell has 2 neighboring cells with the same PCI value. As an example of PCI confusion, consider that Cell #A has a PCI that is different from the PCIs of its two neighbors—Cell #B and Cell #C, but Cell #B and Cell #C have the same PCI. PCI confusion can impact the handover performance as UEs are confused with which cell they should handover to.

At least one objective of MRO is to dynamically improve handover performance in order to improve the end-user experience as well as to increase network capacity. This can be done by automatically configuring the handover parameters to adjust handover boundaries based on the analysis of handover related performance measurements and radio link failure events. Typically, the objective is to eliminate Radio Link Failures (RLFs) and reduce unnecessary handovers. Among other things, embodiments of the present disclosure relate to physical-layer cell identifier (PCI) configuration and Mobility Robustness Optimization (MRO). In particular, the present disclosure discusses 5G SON solutions such as the management of distributed PCI configuration, centralized PCI configuration, and Mobility Robustness Optimization.

PCI Configuration

This section is directed to solutions for the use case of PCI configuration. FIG. 4A shows an example of a flow diagram of the management of distributed PCI (D-PCI) configuration according to embodiments of the present disclosure. In some embodiments, the D-PCI configuration function may reside in a next-generation NodeB (gNB) cell that selects a PCI value from a list of PCI values provided by the D-PCI management function. The D-PCI management function, in turn, may reside on a server in communication with the gNB cell.

Management of Distributed PCI Configuration

The D-PCI management function consumes the management service for NF provisioning with modifyMOIAttributes operation to configure the PCI list for a given NR cell.

The D-PCI management function consumes the management service for NF provisioning with modifyMOIAttributes operation to enable the D-PCI configuration function for a given NR cell.

The D-PCI configuration function randomly selects a PCI value from the PCI list.

The D-PCI configuration function indicates the new PCI value(s) to the management service producer for NF provisioning that will send a notification notifyMOIAttributeValueChange, indicating the PCI value being selected.

The D-PCI configuration function detects the PCI conflict among NR cells, and indicates the PCI conflict to the management service producer for NF fault supervision that will send a notification notifyNewAlarm to the D-PCI management function, indicating that the PCI conflict has been detected on NR cells.

The D-PCI management function may consume the management service for NF provisioning with modifyMOIAttributes operation to update the PCI list for a given NR cell.

D-PCI configuration function reassigns the new PCI value(s) from the PCI list for the affected NR cells, and indicates the new PCI value(s) to the management service producer for NF provisioning that will send a notification notifyMOIAttributeValueChange, indicating the new PCI value(s) being reassigned to mitigate the conflict.

D-PCI configuration function detects that the PCI conflict has been resolved, and indicates it to the management service producer for NF fault supervision that will send a notification notifyClearedAlarm to the D-PCI management function, indicating the PCI conflict has been resolved.

In some embodiments, a network resource model (NRM) may be enhanced to support D-PCI enable/disable, PCI list, PCI value. Additionally, NF fault supervision may be enhanced to PCI conflict alarm notification.

Centralized PCI Configuration

FIG. 4B shows an example of a flow diagram of a C-PCI configuration function in accordance with embodiments of the present disclosure. It is assumed that the C-PCI configuration function has consumed the management service to collect PCI related measurements, and the MOIs related to the PCI configuration has been created.

The C-PCI configuration function collects the PCI related measurements (e.g. the measurements related to measurement report, such as physCellId, MeasQuantityResults, which are generated from the MeasResultNR reported by NG-RAN.

The C-PCI configuration function analyzes the PCI related information and detects that a new deployed NR cell or NR cells have experienced PCI conflict or confusion.

NOTE: C-PCI configuration function may record the count of PCI conflict or confusion in performance measurements.

The C-PCI configuration function consumes the management service for NF provisioning with modifyMOIAttributes operation to configure a specific PCI value or a list values for each newly deployed NR cell.

gNB-CU detects the PCI conflict among NR cells, and indicates the PCI conflict to the management service producer for NF fault supervision that will send a notification notifyNewAlarm to the C-PCI configuration function, indicating the PCI conflict has been detected on NR cells.

C-PCI configuration function consumes the management service for NF provisioning with modifyMOIAttributes operation to reassign new PCI value(s) for each affected NR cell.

gNB-CU detects that the PCI conflict has been resolved, and indicates it to the management service producer for NF fault supervision that will send a notification notifyClearedAlarm to the C-PCI configuration function, indicating the PCI conflict has been resolved. In some embodiments, PCI related measurements may be defined to support centralized PCI configuration function.

Mobility Robustness Optimisation

Figure 4C:
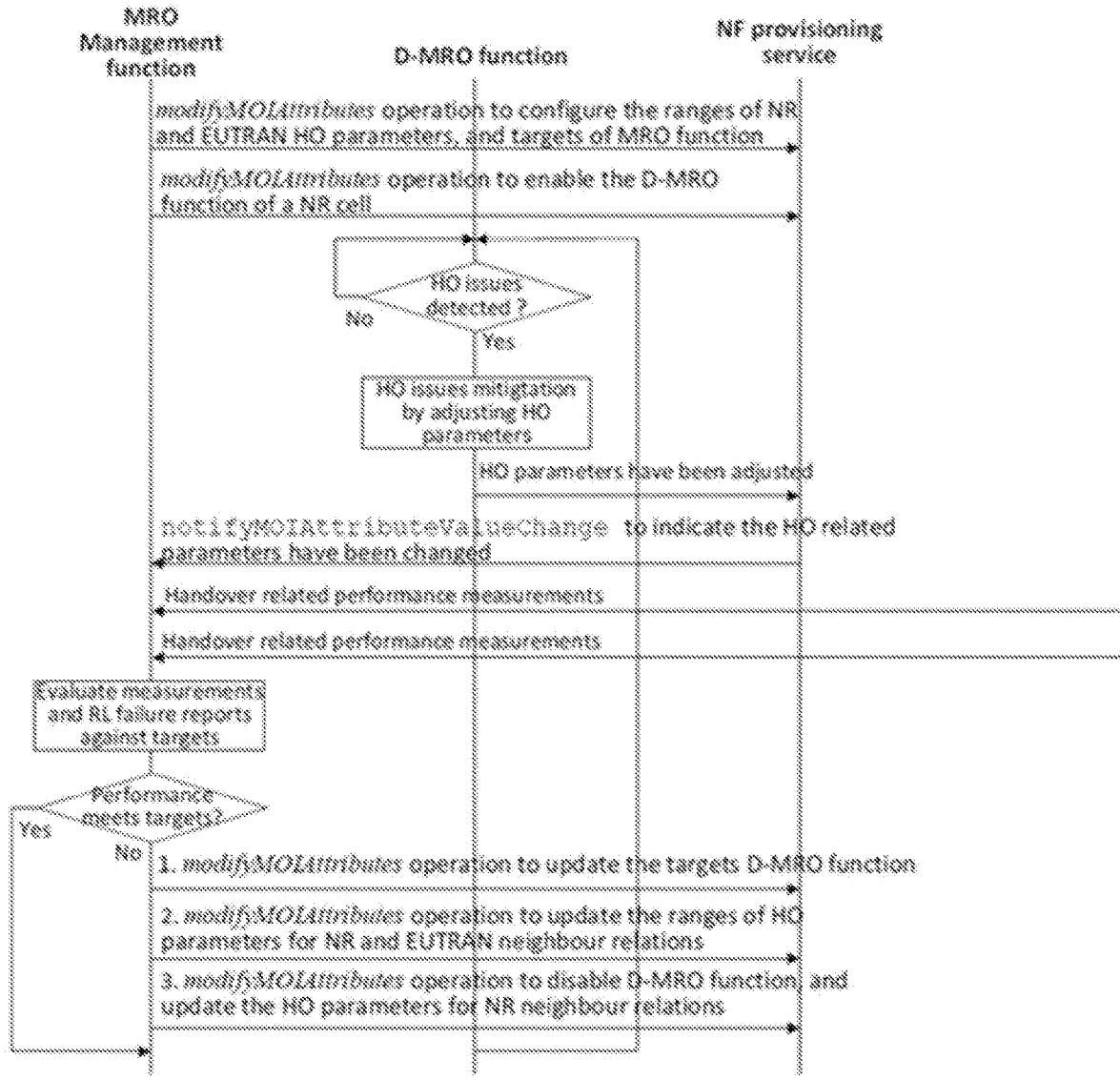
FIG. 4C illustrates an example of mobility robustness optimization in accordance with some embodiments.

This subclause discusses solutions for the use case of mobility robustness optimization (MRO) in accordance with embodiments of the present disclosure. FIG. 4C shows an example of a flow diagram for MRO in accordance with embodiments of the present disclosure.

Management of Mobility Robustness Optimization

It is assumed that the MRO management function has consumed the management service to collects handover related measurements.

The MRO management function consumes the management service for NF provisioning with modifyMOIAttributes operation to configure the ranges for the NR and EUTRAN handover parameters and the targets for the D-MRO function.

The MRO management function consumes the management service for NF provisioning with modifyMOIAttributes operation to enable the D-MRO function for a given NR cell.

The D-MRO function detects the handover issues (e.g. too late HO, too early HO and HO to a wrong cell) in intra-RAT or inter-RAT mobility by analyzing the reports from UE and network side information, and then determine the actions to mitigate the HO issues by adjusting HO related parameters.

The D-MRO function indicates the changes of HO related parameters to the management service producer for NF provisioning that will send a notification notifyMOIAttributeValueChange to the MRO management function (see clause 5.1.9 in TS 28.532 [x]), indicating the HO related parameters have been changed.

The MRO management function collects the handover related measurements and radio link failure reports to evaluate the handover performance (see clause 4.3.5 in TS 32.552 [y]).

The MRO management function analyses the measurements and radio link failure reports, and determines to perform one of the following actions, when the handover performance does not meet the targets:
1. Consume the management service for NF provisioning with modifyMOIAttributes operation to update the targets for the D-MRO function;
2. Consume the management service for NF provisioning with modifyMOIAttributes operation to update the ranges of handover parameters for the NR neighbour relations and EUTRAN neighbour relations;
3. Consume the management service for NF provisioning with modifyMOIAttributes operation to disable D-MRO function, and update the handover parameters (see clause 5.5.4 in TS 38.331 [6]) for NR neighbour relations with values deemed to improve handover performance.

In some embodiments, a network resource model (NRM) may be enhanced to support MRO related attributes, such as MRO ranges, targets, and handover parameters. In some embodiments, handover-related performance measurements may be defined.

Figure 5:
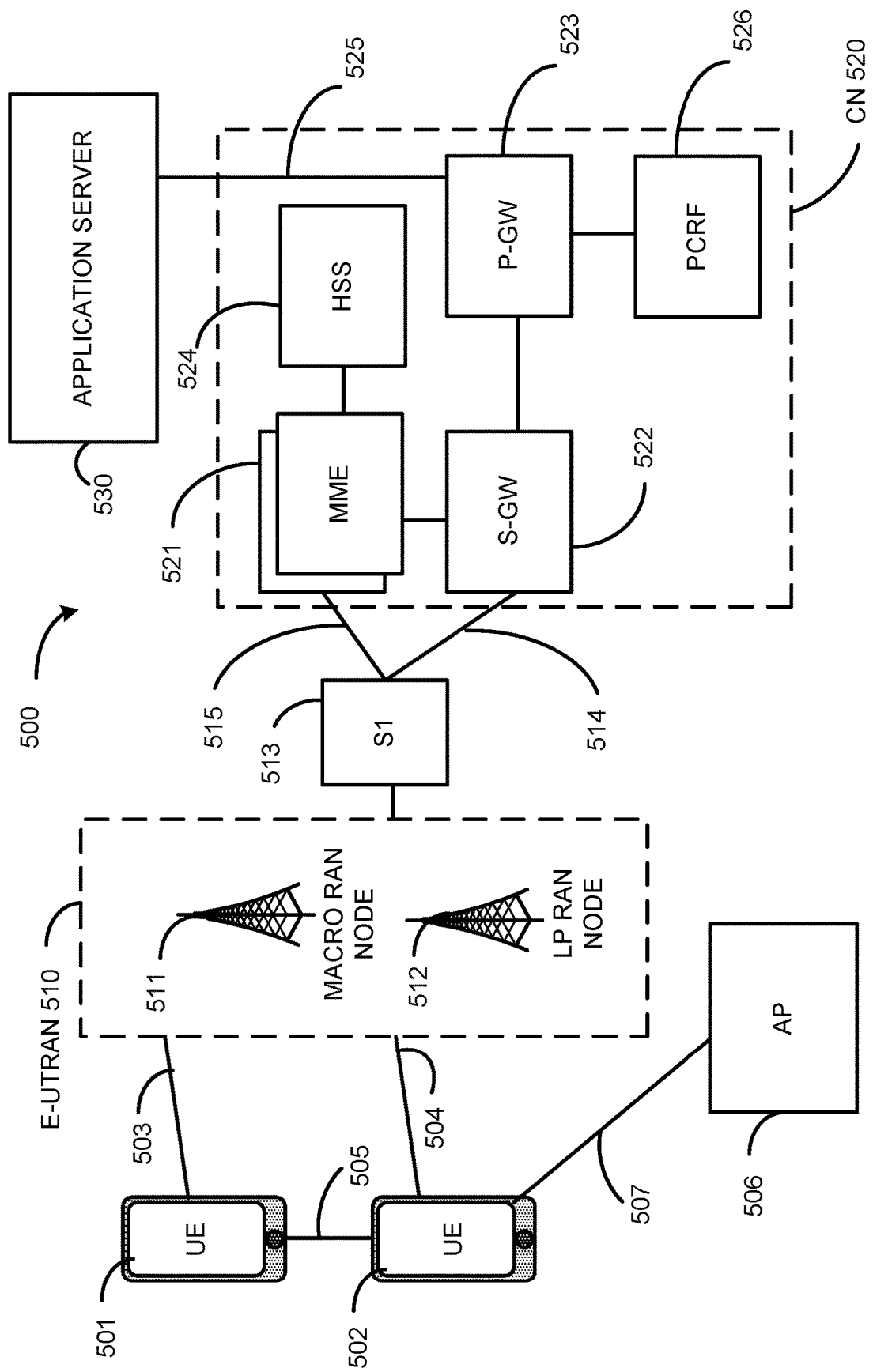
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMES 521.

In this embodiment, the CN 520 comprises the MMES 521, the S-GW 522, the Packet Data Network (PDN) Gateway (P-GW) 523, and a home subscriber server (HSS) 524. The MMES 521 may be similar in function to the control plane of legacy Serving General Packet Radio Service (GPRS) Support Nodes (SGSN). The MMES 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
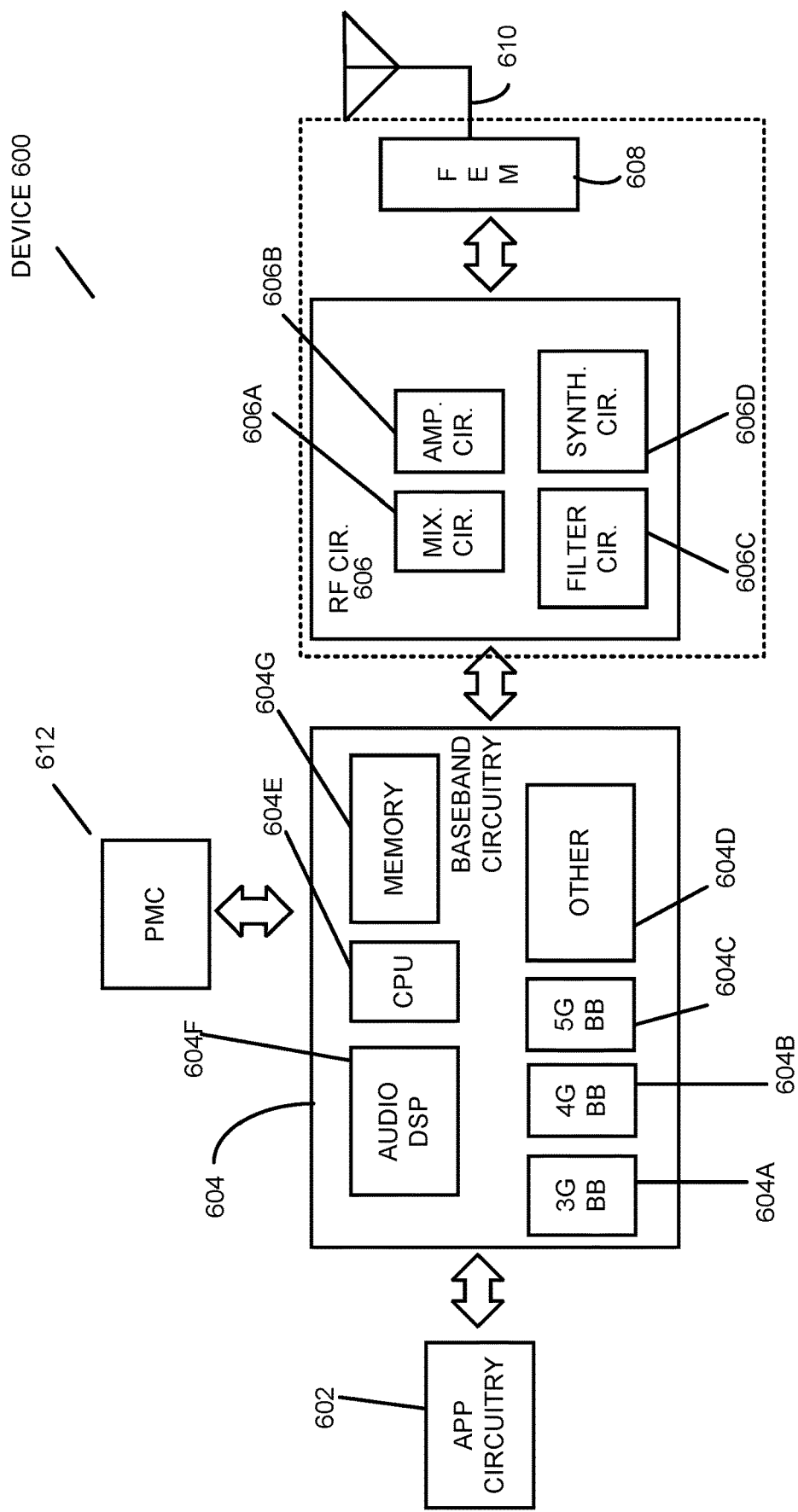
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
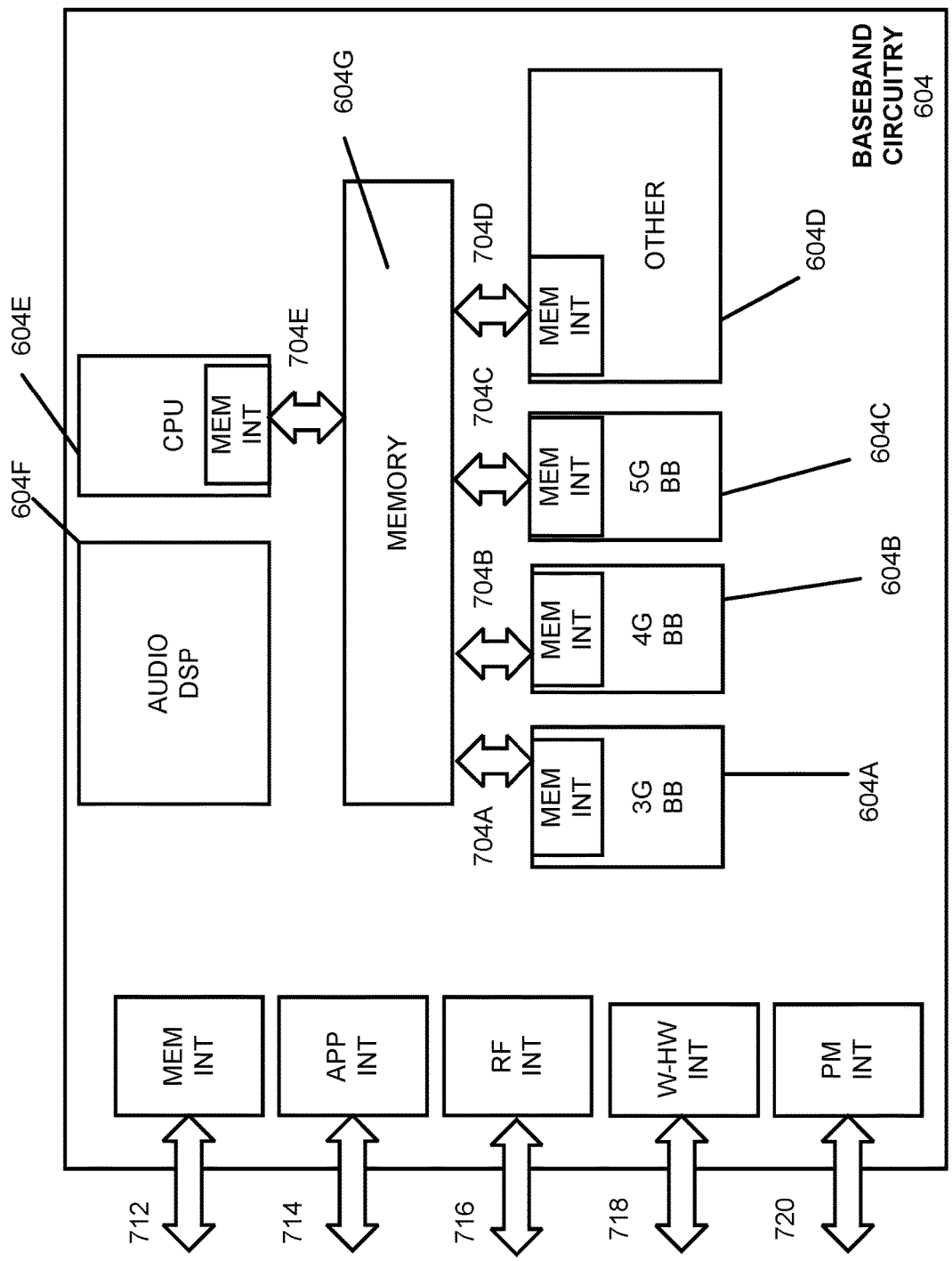
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
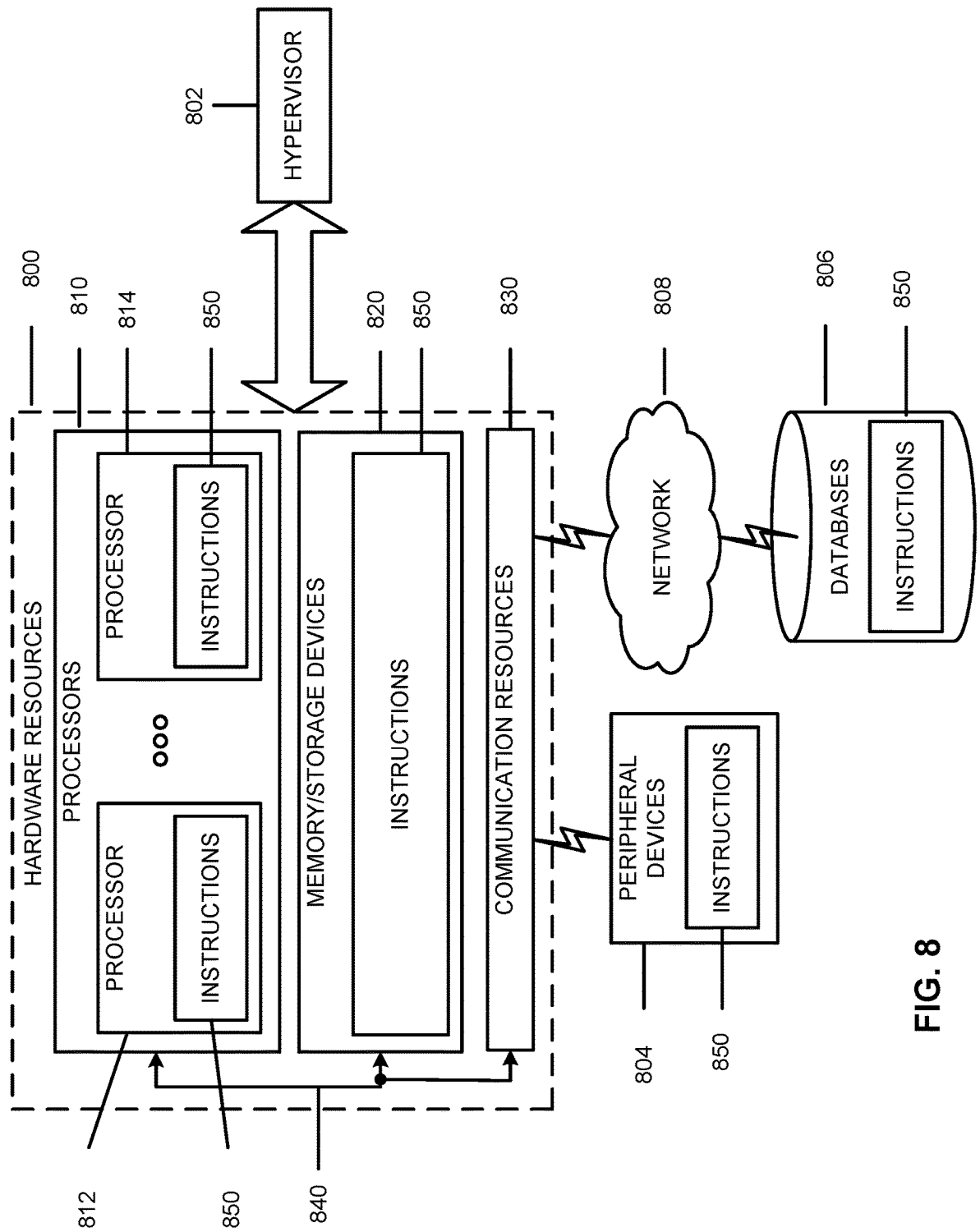
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) or portion thereof. In this example, operation flow/algorithmic structure 100 may include, at 105, detecting a PCI conflict among a plurality of new radio (NR) cells. Operation flow/algorithmic structure 100 may further include, at 110, reassigning PCI values from a PCI list to the plurality of NR cells to mitigate the conflict. Operation flow/algorithmic structure 100 may further include, at 115, generating a resolution notification indicating the PCI conflict has been resolved.

Another example of an operation flow/algorithmic structure is depicted in FIG. 2, which may be performed by a next-generation NodeB (gNB) or portion thereof. In this example, operation flow/algorithmic structure 200 may include, at 205, collecting PCI-related measurements. Operation flow/algorithmic structure 200 may further include, at 210, identifying, based on the PCI-related measurements, PCI conflict or PCI confusion for a new radio (NR) cell. Operation flow/algorithmic structure 200 may further include, at 215, configuring a PCI value or list of PCI values for the NR cell to mitigate the PCI conflict or PCI confusion.

Another example of an operation flow/algorithmic structure is depicted in FIG. 3, which may be performed by a next-generation NodeB (gNB) or portion thereof. In this example, operation flow/algorithmic structure 300 may include, at 305, detecting a handover (HO) issue with intra-radio access technology (RAT) or inter-RAT mobility. Operation flow/algorithmic structure 300 may further include, at 310, adjusting an HO parameter to mitigate the HO issue. Operation flow/algorithmic structure 300 may further include, at 315, generating a notification to indicate the HO parameter has been changed.

EXAMPLES

Some non-limiting examples are provided below.

Example 1 includes an apparatus comprising: memory to store a physical-layer cell identifier (PCI) list; and processor circuitry, coupled with the memory, to: detect a PCI conflict among a plurality of new radio (NR) cells; reassign PCI values from the PCI list to the plurality of NR cells to mitigate the conflict; and generate a resolution notification indicating the PCI conflict has been resolved.

Example 2 includes the apparatus of example 1 or some other example herein, wherein the process circuitry is to instantiate a distributed-PCI (D-PCI) configuration function to detect the PCI conflict, reassign the PCI values, and generate the resolution notification.

Example 3 includes the apparatus of example 2 or some other example herein, wherein to detect the PCI conflict the D-PCI configuration function is to inform a management service producer for network function (NF) fault supervision to send a notifyNewAlarm notification to a PCI management function to indicate that the PCI conflict has been detected.

Example 4 includes the apparatus of example 3 or some other example herein, wherein the resolution notification is a notifyClearedAlarm notification and the D-PCI configuration function is further to send the notifyClearedAlarm notification to the PCI management function.

Example 5 includes the apparatus of example 2 or some other example herein, wherein the D-PCI configuration function is to generate a notifyMOIAttributeValueChange notification to indicate the reassigned PCI values.

Example 6 includes the apparatus of example 2 or some other example herein, wherein the D-PCI configuration function is to randomly select a PCI value from the PCI list to reassign the PCI values.

Example 7 includes one or more non-transitory computer-readable media storing instructions that, when executed by one or more processors, are to cause a centralized-physical-layer cell identifier (C-PCI) configuration function to: collect PCI-related measurements; identify, based on the PCI-related measurements, PCI conflict or PCI confusion for a new radio (NR) cell; and configure a PCI value or list of PCI values for the NR cell to mitigate the PCI conflict or PCI confusion.

Example 8 includes the one or more non-transitory computer-readable media of example 7 or some other example herein, wherein the PCI-related measurements include performance measurements.

Example 9 includes the one or more non-transitory computer-readable media of example 8 or some other example herein, wherein to identify the PCI conflict or PCI confusion, the C-PCI configuration function is to record a count of PCI conflicts or PCI confusions in the performance measurements.

Example 10 includes the one or more non-transitory computer-readable media of example 7 or some other example herein, wherein to configure the PCI value or list of PCI values, the C-PCI configuration function is to consume a management service for network function (NF) provisioning with a modifyMOIAttributes operation.

Example 11 includes the one or more non-transitory computer-readable media of example 7 or some other example herein, wherein the media further stores instructions for causing the C-PCI configuration function to: receive a notifyNewAlarm notification indicating a next-generation NodeB (gNB) detects a PCI conflict among a plurality of NR cells; and consume a management service for network function (NF) provisioning with a modifyMOIAttributes operation to reassign a respective new PCI value to each respective cell in the plurality of NR cells.

Example 12 includes the one or more non-transitory computer-readable media of example 11 or some other example herein, wherein the media further stores instructions for causing the PCI configuration function to receive a notifyClearedAlarm notification to indicate the PCI conflict has been resolved.

Example 13 includes one or more non-transitory computer-readable media storing instructions that, when executed by one or more processors, cause a distributed-mobility robustness optimization (D-MRO) function to: detect a handover (HO) issue with intra-radio access technology (RAT) or inter-RAT mobility; adjust an HO parameter to mitigate the HO issue; and generate a notification to indicate the HO parameter has been changed.

Example 14 includes the one or more non-transitory computer-readable media of example 13 or some other example herein, wherein the notification is a notifyMOIAttributeValueChange that is sent to an MRO management function.

Example 15 includes the one or more non-transitory computer-readable media of example 14 or some other example herein, wherein the MRO management function is to collect handover-related measurements and radio link failure reports to evaluate handover performance.

Example 16 includes the one or more non-transitory computer-readable media of example 15 or some other example herein, wherein the MRO management function is to determine, based on the handover-related measurements and radio link failure reports, that the handover performance does not meet a target.

Example 17 includes the one or more non-transitory computer-readable media of example 16 or some other example herein, wherein the MRO management function is to consume a management service for network function (NF) provisioning with a modifyMOIAttributes operation in response to determining that the handover performance does not meet the target.

Example 18 includes the one or more non-transitory computer-readable media of example 17 or some other example herein, wherein the modifyMOIAttributes operation is to update a target of the D-MRO function.

Example 19 includes the one or more non-transitory computer-readable media of example 17 or some other example herein, wherein the modifyMOIAttributes operation is to update ranges of handover parameters for new radio (NR) neighbor relations or evolved universal terrestrial radio access network (EUTRAN) neighbor relations.

Example 20 includes the one or more non-transitory computer-readable media of example 17 or some other example herein, wherein the modifyMOIAttributes operation is to disable the D-MRO function and update handover parameters.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus comprising:
    memory circuitry to store a physical-layer cell identifier (PCI) list; and
    processor circuitry, coupled with the memory circuitry, to instantiate a distributed-PCI (D-PCI) configuration function adapted to:
    detect a PCI conflict among a plurality of new radio (NR) cells;
    reassign PCI values from the PCI list to the plurality of NR cells to mitigate the conflict;
    indicate the PCI values to a management service producer for network function (NF) provisioning, wherein the indication of the PCI values is to cause the management service producer for NF provisioning to send a notifyMOIAttributeValueChange notification, and the notifyMOIAttributeValueChange notification is to indicate the PCI values being reassigned to mitigate the detected PCI conflict;
    detect that the PCI conflict has been resolved;
    generate a resolution notification to indicate the PCI conflict has been resolved; and
    indicate the resolution of the PCI conflict to the management service producer for NF fault supervision, wherein the indication of the resolution is to cause the management service producer for NF fault supervision to send a notifyClearedAlarm notification to a D-PCI management function, and the notifyClearedAlarm notification is to indicate the resolution of the PCI conflict.

2. The apparatus of claim 1, wherein the D-PCI configuration function is adapted to detect the PCI conflict, reassign the PCI values, and generate the resolution notification.

3. The apparatus of claim 2, wherein the resolution notification is a notifyClearedAlarm notification and the D-PCI configuration function is further to send the notifyClearedAlarm notification to the PCI management function.

4. The apparatus of claim 2, wherein the D-PCI configuration function is adapted to generate a notifyMOIAttributeValueChange notification to indicate the reassigned PCI values.

5. The apparatus of claim 2, wherein the D-PCI configuration function is adapted to randomly select a PCI value from the PCI list to reassign the PCI values.

6. The apparatus of claim 5, wherein the D-PCI configuration function is adapted to indicate the selected PCI value to a management service producer for NF provisioning, wherein the indication of the selected PCI value is to cause the management service producer for NF provisioning to send a notifyMOIAttributeValueChange notification, and the notifyMOIAttributeValueChange notification is to indicate the PCI value being selected.

7. The apparatus of claim 2, wherein, to detect the PCI conflict, the D-PCI configuration function is adapted to inform a management service producer for NF fault supervision to send a notifyNewAlarm notification to a PCI management function to indicate that the PCI conflict has been detected.

8. One or more non-transitory computer-readable media (NTCRM) comprising instructions of a distributed-PCI (D-PCI) configuration function, wherein execution of the instructions by one or more processors is to cause a compute node to:
  detect a physical-layer cell identifier (PCI) conflict among a plurality of new radio (NR) cells;
  reassign PCI values from the PCI list to the plurality of NR cells to mitigate the conflict;
  indicate the PCI values to the management service producer for network function (NF) provisioning, wherein the indication of the PCI values is to cause the management service producer for NF provisioning to send a notifyMOIAttributeValueChange notification, and the notifyMOIAttributeValueChange notification is to indicate the PCI values being reassigned to mitigate the detected PCI conflict;
  detect that the PCI conflict has been resolved;
  generate a resolution notification to indicate the PCI conflict has been resolved; and
  indicate resolution of the PCI conflict to the management service producer for NF fault supervision, wherein the indication of the resolution is to cause the management service producer for NF fault supervision to send a notifyClearedAlarm notification to a D-PCI management function, and the notifyClearedAlarm notification is to indicate the resolution of the PCI conflict.

9. The one or more NTCRM of claim 8, wherein execution of the instructions is to cause the compute node to detect the PCI conflict, reassign the PCI values, and generate the resolution notification.

10. The one or more NTCRM of claim 9, wherein, to detect the PCI conflict, execution of the instructions is to cause the compute node to inform a management service producer for NF fault supervision to send a notifyNewAlarm notification to a PCI management function to indicate that the PCI conflict has been detected.

11. The one or more NTCRM of claim 9, wherein the resolution notification is a notifyClearedAlarm notification and the D-PCI configuration function is to send the notifyClearedAlarm notification to the PCI management function.

12. The one or more NTCRM of claim 9, wherein execution of the instructions is to cause the compute node to generate a notifyMOIAttributeValueChange notification to indicate the reassigned PCI values.

13. The one or more NTCRM of claim 9, wherein execution of the instructions is to cause the compute node to randomly select a PCI value from the PCI list to reassign the PCI values.

14. The one or more NTCRM of claim 13, wherein execution of the instructions is to cause the compute node to indicate the selected PCI value to a management service producer for NF provisioning, wherein the indication of the selected PCI value is to cause the management service producer for NF provisioning to send a notifyMOIAttributeValueChange notification, and the notifyMOIAttributeValueChange notification is to indicate the PCI value being selected.

* * * * *